United States Patent [19]

Hiraoka et al.

[11] 4,447,275

[45] May 8, 1984

[54] CYLINDER LINER

[75] Inventors: Takeshi Hiraoka; Shigeru Urano, both of Saitama; Kiyoshi Yamamoto, Chiba, all of Japan

[73] Assignee: Nippon Piston Ring Co., Ltd., Tokyo, Japan

[21] Appl. No.: 342,282

[22] Filed: Jan. 25, 1982

[30] Foreign Application Priority Data

Jan. 28, 1981 [JP] Japan ........................ 56-10257

[51] Int. Cl.³ .................... C21D 1/06; F02F 1/10; B23P 9/00

[52] U.S. Cl. .................... 148/152; 148/35; 148/39; 29/156.4 WL; 123/41.72; 123/41.84

[58] Field of Search .................... 148/4, 35, 39, 152, 148/31.5; 75/123 CB; 123/193 C; 29/156.4 WL; 219/121 EB, 121 LM; 384/276; 308/DIG. 8; 277/81 P; 418/178; 123/41.72, 41.81, 41.83, 41.84

[56] References Cited

U.S. PATENT DOCUMENTS

| | | | |
|---|---|---|---|
| 1,853,562 | 4/1932 | Herr | 29/156.4 WL |
| 2,361,434 | 10/1944 | Surtees | 29/156.4 WL |
| 3,773,565 | 11/1973 | Pye et al. | 148/4 |
| 3,998,664 | 12/1976 | Rote | 75/123 CB |
| 4,000,011 | 12/1976 | Sato et al. | 148/39 |
| 4,017,708 | 4/1977 | Engel et al. | 219/121 LM |
| 4,093,842 | 6/1978 | Scott | 219/121 LM |
| 4,122,240 | 10/1978 | Banas et al. | 148/4 |

FOREIGN PATENT DOCUMENTS

| | | | |
|---|---|---|---|
| 52-5617 | 1/1977 | Japan | 75/123 CB |
| 54-99019 | 8/1979 | Japan | 148/4 |
| 685709 | 9/1979 | U.S.S.R. | 75/123 CB |

OTHER PUBLICATIONS

Wakefield, Brian D., "Laser Light on the Beam for Heat Treating Duty", Iron Age, Feb. 10, 1975, pp. 45–47.

*Primary Examiner*—L. Dewayne Rutledge
*Assistant Examiner*—Robert L. McDowell
*Attorney, Agent, or Firm*—Sughrue, Mion, Zinn, Macpeak & Seas

[57] ABSTRACT

A cylinder liner for an internal combustion engine has a white case iron layer formed by remelting and cooling a part or whole of areas of an outer peripheral surface of the cylinder liner. A thermally affected layer is also formed between the white cast iron layer and the parent material. This cylinder liner has improved anti-cavitation properties.

22 Claims, 4 Drawing Figures

CYLINDER LINER

FIELD OF THE INVENTION

The present invention relates to a cylinder liner for an internal combustion engine and more particularly to a cylinder liner having improved anti-cavitation properties.

BACKGROUND OF THE INVENTION

A cylinder liner of a water-cooled internal combustion engine comes into contact with cooling water at the outer peripheral surface thereof and this leads to cavitation erosion in the areas of the outer peripheral surface coming into contact with the cooling water. The causes of cavitation erosion are chemical corrosion caused by the cooling water and mechanical corrosion caused by vibration of the cylinder liner. It is generally believed that the latter mechanical corrosion is mainly responsible for the cavitation erosion. High-speed vibration of the cylinder liner produces local pressure variations in the cooling water and the local pressure variations cause local formation and disappearance of bubbles. The formation and disappearance of bubbles provides repeated shocks to the cylinder liner which causes the mechanical corrosion. Thus the cavitation erosion is maximum in those directions where the vibration of the internal combustion engine is vigorous, i.e., the so-called thrust and counter thrust directions perpendicular to a crankshaft.

Various proposals have heretofore been made to prevent such cavitation erosion and they can be divided broadly into:

(1) a method of treating the surface of a cylinder liner, and (2) a method of strengthening the structure of a cylinder liner and a cylinder block.

The methods which are classified into the latter structure-stengthening method (2) include a method in which a post or a fin is provided to prevent the vibration of the cylinder liner in the thrust direction and a method in which a cylinder block or cylinder liner is molded into a corrugated form to disperse the vibration.

Usually, however, the former surface-treating method (1) has been employed. Examples of the surface treating methods include a method in which a rigid chromium layer is plated onto the outer peripheral surface of the cylinder liner, a method in which a sprayed ceramic layer is formed on the cylinder liner, a method in which a steel plate is attached to the outer peripheral surface of the cylinder liner, and a method wherein while casting a cylinder liner a chilled structure is formed in the outer peripheral surface of the cylinder liner by the use of chillers.

With cylinder liners subjected to a cavitation-preventing treatment in accordance with the structure-strengthening method (2), the effect of preventing the cavitation varies depending on the state in which the engine is operated and therefore cavitation may still occur if the engine is not operated properly.

On the other hand, when the surface-treating method (1) is employed, the effect varies depending on the hardness and structural strength of a layer formed in or provided on the outer peripheral surface of the cylinder liner. It has been confirmed experimentally that cylinder liners with a layer having a high hardness and containing no defects in the surface exhibit a high resistance to the impact due to the formation and collapse of bubbles on the outer peripheral surface thereof. For example, a rigid chromium plated surface shows much higher resistance than cast iron in which graphite grains are dispersed (these graphite grains are regarded as defects).

A cylinder liner with a rigid chromium layer which is formed by plating or a ceramic layer which is formed by spraying suffers from various problems which are not desirable from a standpoint of commercial production. In particular, the time required for the production of such layers is long and the starting materials used in these surface treatment methods are expensive.

With a cylinder liner with a chilled structure formed in the outer peripheral surface thereof (as disclosed in Japanese Utility Model Publication No. 25530/1979), the chilled structure (a white cast iron layer) has a high hardness and contains no free graphite. Therefore, the cylinder liner has a high resistance to cavitation. Chilling using chillers, etc., results in the formation of a two layer structure composed of a chilled structure and a parent material. This gives rise to the problems described hereinbelow.

Although a hard layer (a chromium layer or chilled structure) having a thickness of 0.3 mm or less has static conditions independent of the parent material, its dynamic conditions, e.g., fatigue, is influenced by the parent material. The influence of such dynamic conditions on cavitation is not small. Therefore, the hard layer provided on the parent material is required to have a certain minimum thickness. Since the chilled structure has a hardness lower than that of the rigid chromium layer formed by plating and in addition is easily influenced by dynamic conditions, it is necessary to increase the thickness of the chilled structure to a very high level. Moreover, since the chilled structure is formed by forced cooling from the outer peripheral surface, uneven cooling readily occurs. Furthermore, the chilled structure is greatly influenced by the stream of a cast melt. It is therefore very difficult to provide a stable chilled structure having a predetermined thickness. In particular, it is commercially impossible to form a chilled structure having a thin and uniform thickness. For these reasons the thickness of the chilled structure (including the unevenness) is inevitably increased to at least 2 mm. Therefore, when a relatively thin cylinder liner is used, the formation of such a thick chilled structure influences the inner peripheral surface of the cylinder liner and changes the structure and hardness of the inner peripheral surface. Moreover, when chilling reaches near the inner peripheral surface, working becomes difficult.

SUMMARY OF THE INVENTION

Accordingly, the object of the invention is to solve an above described problems of the conventional cylinder liners, particularly those cylinder liners having a white cast iron layer formed in the outer peripheral surface thereof.

It has been found that the above object can be attained by forming:

(1) a remelted white cast iron structure in a part or whole of areas of the outer peripheral surface of the cylinder liner which come into contact with cooling water; and (2) a thermally affected layer between the white cast iron structure and the parent material.

Therefore, according to the present invention a white cast iron layer is formed by remelting and cooling a part or whole of areas of the outer peripheral surface of the cylinder liner which are exposed to cooling water. At the same time, a thermally affected layer having a thickness of at least 0.05 mm is formed between the white cast iron layer and the parent material of the cylinder liner.

DESCRIPTION OF THE PREFERRED EMBODIMENTS

Figure 1:
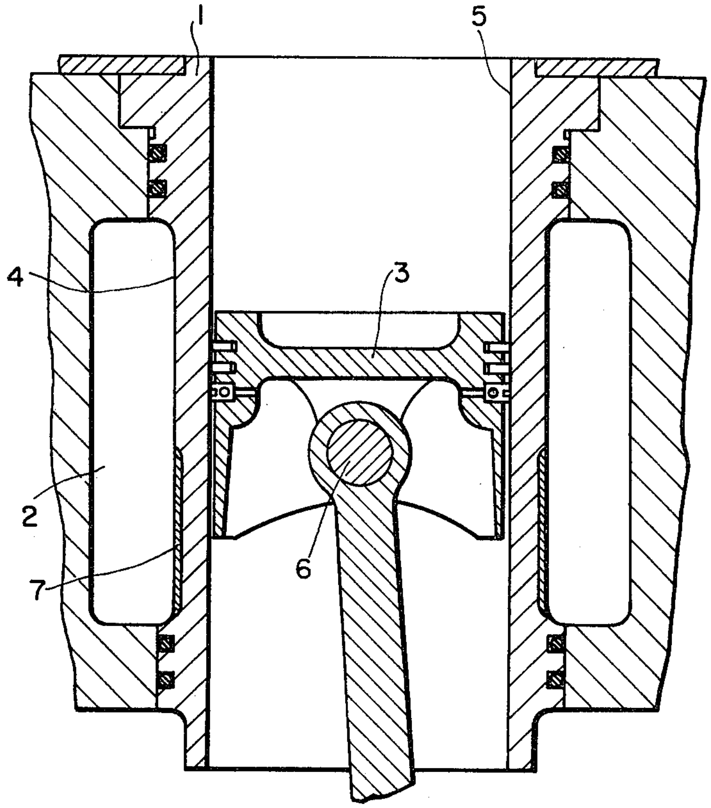
FIG. 1 is a cross sectional view of a significant part of an internal combustion engine equipped with a cylinder liner of the invention.

Referring to FIG. 1, a cylinder liner 1 has an outer peripheral surface 4 which forms a cooling water conduit 2. A piston 3 slides on an inner peripheral surface 5 of the cylinder liner. Cavitation readily occurs at the thrust side of the outer peripheral surface 4 of the cylinder liner 1 in a direction perpendicular to a piston pin 6. In accordance with the invention, a white cast iron layer is formed on an outer peripheral surface area 7 of the cylinder liner 1 including at least those surface areas where cavitation readily occurs.

Figure 2:
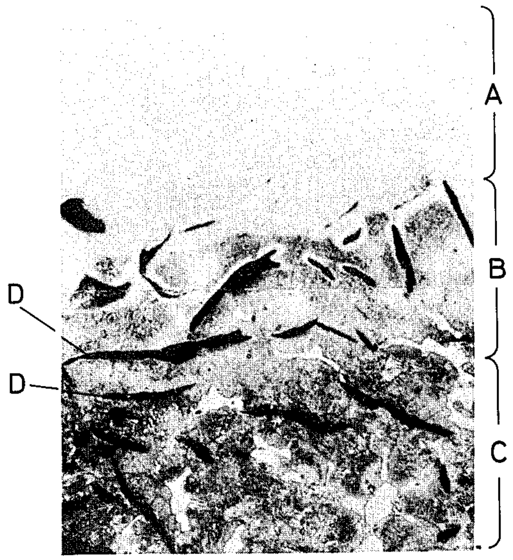
FIG. 2 is a microscopic photograph (x 200) of a cross section of the cylinder liner of FIG. 1 which is etched with a Nital liquid to show the structure of the cylinder liner.

FIG. 2 is a partial enlarged photograph showing the structure of the cylinder liner of FIG. 1 which was obtained by photographing a cross section of the cylinder liner corroded with a Nital liquid by the use of a 200 magnification microscope. As is shown in FIG. 2, a remelted and cooled white cast iron layer A is present in the outer peripheral surface of the cylinder liner, and a thermally affected layer B is present between the white cast iron layer A and the parent material C. The parent material C is usually cast iron. The thickness of the white cast iron layer A and the thermally affected layer B are 0.2 mm and 0.1 mm, respectively. The white cast iron layer A and thermally affected layer B are prepared under the following conditions:

Remelting Method: Electron beam processing
Acceleration Voltage: 50 KV
Beam Current: 40 mA
Speed: 0.4 m/min
Focal Point: Outer peripheral surface of cylinder liner The white cast iron layer formed in the outer peripheral surface of the cylinder liner of the invention has a high hardness and furthermore does not contain free graphite D. Therefore the cylinder liner of the invention has excellent corrosion resistance to cavitation. Since the thermally affected layer B is present between the white cast iron layer A and the parent material C, even though the white cast iron layer is thin, the thermally affected layer B has a relatively high hardness and supports the white cast iron layer A against dynamic influences from the outer peripheral surface side of the cylinder liner such as shocks resulting from the formation and disappearance of bubbles by the cavitation phenomenon discussed above. This improves the cylinder liner's corrosion resistance to cavitation. Furthermore, as can be seen from FIG. 2, the presence of the thermally affected layer B completely removes the influences which the formation of the white cast iron layer may otherwise exert on the parent material and vise versa. In other words, the amount of graphite in the white cast iron layer A is substantially reduced and the inner peripheral surface of the cylinder liner is entirely free of any influences resulting by the treatment of the outer peripheral surface of the cylinder liner.

The cylinder liner of the invention is obtained by remelting and cooling the peripheral surface of the cylinder liner. The remelted outer peripheral surface of the cylinder liner is cooled mainly by the cylinder liner itself from the inner peripheral surface thereof. Thus the remelted part mainly forms the white cast iron layer of the invention, and a thermally effected part mainly forms the thermally effected layer of the invention.

The thermally affected layer of the invention is similar to a usual quenched layer. In the thermally affected layer of the invention, however, various mixed structures exist. For example, a mixed martensitic structure obtained by quenching non-melted cast iron portion from a temperature just below its melting temperature and by quenching a melted cast iron portion (white cast iron) exists just below the white cast iron layer while just above the parent material a structure similar to a sorbitic structure is formed. Thus, as a whole, the thermally affected layer has a hardness higher than that of a quenched layer. The remelting step enables one to easily and surely obtain a white cast iron layer having the desired thickness. It is desirable to apply the remelting treatment onto the outer peripheral surface of the cylinder liner which has been previously machined and grinded. This allows one to minimize surface irregularities and dimensional changes associated with the remelting of the outer peripheral surface of the cylinder liner and eliminates any need for any post surface treatment.

The thickness of the white cast iron layer formed by the remelting and cooling of the cylinder liner is required to be at least 0.05 mm (as an average thickness) in order to obtain the desired anticorrosion effect.

The average thickness of the white cast iron layer is determined by dividing the area of the white cast iron layer in the cross section of the cylinder liner by the peripheral length of the white cast iron layer. Undulations and dimensional changes associated with the remelting of the white cast iron layer occur periodically, however, the average thickness of the cross or vertical section of the cylinder liner is almost constant. The thickness of the thermally affected layer varies depending on the thickness of the white cast iron layer. However, when the thermally affected area is at least 0.05 mm thick, the thermally affected layer has a hardness higher than that of the parent material supporting the white cast iron layer. Therefore, even though cavitation may form bits in thin sections of the white cast iron layer, a 0.05 mm thick thermally affected layer will maintain the desired anticorrosion properties. It is desirable, however, that the total thickness of the white cast iron layer and the thermally affected layer be at least 0.15 mm.

The ratio of the total thickness of the white cast iron layer and the thermally affected layer to the thickness of the cylinder liner should be determined so that the white cast iron layer and the thermally affected layer do not exert adverse influences on the inner peripheral surface of the cylinder liner. Generally, the white cast iron layer and the thermally affected layer should comprise no more than half the thickness of the entire cylinder liner. The thickness of the white cast iron layer is determined so that it shows a Vickers hardness of at least 600, and the thickness of the thermally affected layer is determined so that it shows a Vickers hardness of at least 400. Those white cast iron layers and thermally affected layers having hardnesses lower than the above described values do not have suitable anticorrosion properties.

Representative techniques which can be used for the remelting and cooling required by the invention include an electron bombardment under vacuum and a treatment with an apparatus using a plasma arc or laser beam. When heating apparatusses using such high density heat sources are employed, scanning traces of the heat beam remain on the melted surface causing the undulations in the melted surface. The undulations in the melted surface vary depending on the apparatus power output, a scanning speed, a scanning direction, the rotation of the cylinder liner to be treated, and so forth. The degree of the undulations desirably should be small and it is desirable to select the treatment conditions so that the degree of the undulations is minimized.

When heating with such high density heat sources to obtain the remelted structure, a slight unevenness in the thickness of the white cast iron layer results. However, since there is almost no change in the thickness of the thermally affected layer being formed below the white cast iron layer, even though the thickness of the white cast iron layer is locally 0.05 mm or less, such thin areas are never inferior in resisting cavitation because the thermally affected layer supports the white cast iron layer.

The thickness of the white cast iron layer varies depending on the beam conditions and the thickness of the cylinder liner. When the beam power is increased to achieve melting in a thickness of 1 mm or more, super heating of the cylinder liner occurs and no white cast iron layer is formed. Therefore, it is desirable that the thickness of the remelted part be 1 mm or less. The thickness of the white cast iron layer and the thermally affected layer is correlated with the focus point of the electron beam relative to the cylinder liner. As the focus point is lowered from the outer peripheral surface, the thickness of the layer formed is increased. In order to obtain a white cast iron layer which contains only a limited number of blowholes and is tough, it is desirable to adjust the focus point at a point deep below the outer peripheral surface. Although the pitch of beam treatment is correlated with operation efficiency, when the pitch is too broad areas where only a thermally affected layer is formed and no white cast iron layer is formed result.

Also, in order to form a thermally affected layer having a thickness exceeding a certain level, the pitch of the beam treatment should be narrowed to a level exceeding a certain limit. The thickness of the thermally affected layer is controlled by cooling the inner diameter zone at the beam treatment when the thickness of the cylinder liner is small, and when the thickness of the cylinder is large, by applying techniques such as preheating prior to the beam treatment.

As described above, the cylinder liner of the invention has a white cast iron layer formed by remelting and cooling in the outer peripheral surface thereof and a thermally affected layer between the white cast iron layer and the parent material. Such a liner has various advantages some of which are set forth below.

(1) Even though the white cast iron layer is relatively thin, the cylinder liner exhibits excellent anti-cavitation properties;

(2) the white cast iron layer does not exert any adverse influences on the inner peripheral surface of the cylinder liner; and (3) producing the cylinder liner of the invention is easy, the working accuracy is high, and thus the productivity is very good.

Figure 3:
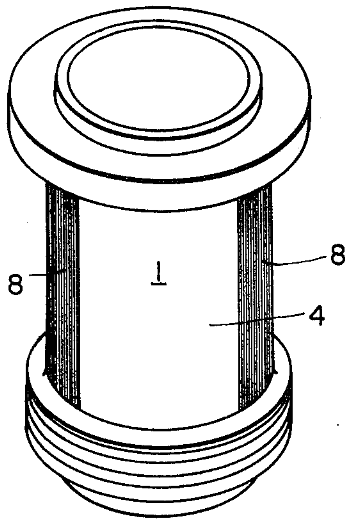
FIGS. 3 and 4 are each a perspective view of another cylinder liner of the invention.
Figure 4:
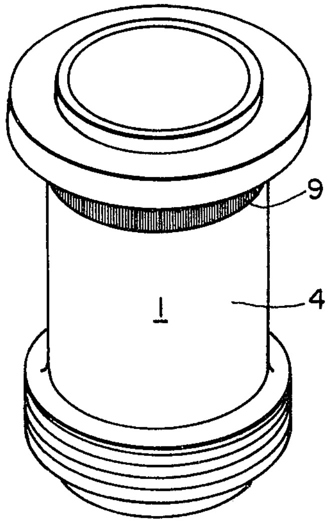

The white cast iron layer and the thermally affected layer may be formed only in those areas where cavitation occurs inherently in an internal combustion engine, e.g., a thrust direction zone 8 of a cylinder liner 1 or a circular zone 9 of the outer peripheral surface in the vicinity of the dead point thereof, as illustrated in FIGS. 3 and 4. If necessary, the white cast iron layer and the thermally affected layer may be formed in the entire outer peripheral surface.

When an electron beam apparatus is used for remelting in vacuum, the cooling is achieved only by the heat capacity of the cylinder liner. Therefore the cooling speed is greatly stabilized and the white cast iron layer and thermally affected layer can be formed uniformly. It is also possible to control the thickness of the white cast iron layer and the thermally affected layer by blowing an inert gas from the periphery for cooling. Furthermore, after quenching the cylinder liner in advance, the cylinder liner may then be remelted and cooled to form the white cast iron layer and the thermally affected layer, and thereafter, the thickness of each layer can be controlled. It may also be desirable to apply a heat treatment to remove heat strain in the thermally affected layer.

We claim:

1. A cylinder liner for an internal combustion engine, comprising:

a white cast iron layer formed on a part of an outer peripheral surface of said cylinder liner which is exposed to cooling water;

a thermally affected layer formed between said white cast iron layer and a parent material of said cylinder liner, said thermally affected layer having a thickness of at least 0.05 mm;

said white cast iron layer and said thermally affected layer being formed by remelting and cooling said part of said outer peripheral surface of said cylinder liner.

2. The cylinder liner claimed in claim 1, wherein said part of said outer peripheral surface of said cylinder liner has been machined prior to being remelted and cooled.

3. The cylinder liner claimed in claim 2, wherein said white cast iron layer has an HV (Vickers hardness) of at least 600 and an average thickness of at least 0.05 mm, a total thickness of said white cast iron layer and said thermally affected layer being at least 0.15 mm and being less than or equal to half the thickness of the entire cylinder liner, said thermally affected layer having an HV of at least 400.

4. The cylinder liner claimed in claim 3 wherein said parent material is cast iron.

5. The cylinder liner claimed in claim 4 wherein said remelting is accomplished by using an electron beam under vacuum.

6. The cylinder liner claimed in claim 4 wherein in said remelting is accomplished by using a plasma arc or laser beam.

7. The cylinder liner claimed in claim 4 wherein said cooling is accomplished by said cylinder liner itself.

8. The cylinder liner claimed in claim 7 wherein an inert gas is used to aid in cooling.

9. The cylinder liner claimed in claim 4 wherein said thermally affected layer has a varied structure, said thermally affected layer having a mixed martensitic structure near said white cast iron layer and having a structure similar to a sorbitic structure near said parent material.

10. The cylinder liner claimed in claim 9 wherein a whole area of said outer peripheral surface of said cylinder liner which is exposed to cooling water is remelted.

11. The cylinder liner claimed in claim 4 wherein a total thickness of said part of said outer peripheral surface of said cylinder liner which is remelted is less than 1.0 mm.

12. A method for forming a cylinder liner for an internal combustion engine, comprising the steps of:

remelting a part of an outer peripheral surface of said cylinder liner which is exposed to cooling water; and cooling said parts remelted to form a thermally affected layer on a parent material of said cylinder liner and a white cast iron layer on said thermally affected layer, said white cast iron layer being on said outer peripheral surface of said cylinder liner, said thermally affected layer having a thickness of at least 0.05 mm.

13. The method claimed in claim 12 further comprising the step of machining said part of said outer peripheral surface of said cylinder liner prior to said remelting and cooling.

14. The method claimed in claim 13 wherein said white cast iron layer has a HV (Vickers hardness) of at least 600 and an average thickness of at least 0.05 mm, the total thickness of said white cast iron layer and thermal affected layer being at least 0.15 mm and being less than half the thickness of the entire cylinder liner, said thermally affected layer having an HV of at least 400.

15. The method claimed in claim 14 wherein said parent material is cast iron.

16. The method claimed in claim 15 wherein said remelting is accomplished by using an electron beam under vacuum.

17. The method claimed in claim 15 wherein said remelting is accomplished by using a plasma laser.

18. The method claimed in claim 15 wherein said cooling is accomplished by an inner peripheral surface of said cylinder lining absorbing heat generated during and after said remelting.

19. The method claimed in claim 18 wherein an inert gas is used to aid in cooling.

20. The method claimed in claim 19 wherein a whole area of said outer peripheral surface of said cylinder liner which is exposed to cooling water is remelted.

21. The method claimed in claim 15 wherein said thermally affected layer has a varied structure, said thermal affected layer having a mixed martensitic structure near said where cast iron layer and having a structure similar to a sorbitic structure near said parent material.

22. The method claimed in claim 15 wherein a total thickness being remelted is less than 1.0 mm.

* * * * *